May 11, 1943.  LE ROY T. BARNETTE  2,318,589

METHOD OF MAKING AN ARTICLE OF MANUFACTURE

Filed Aug. 2, 1940

INVENTOR
LEROY T. BARNETTE
BY
Hyde and Meyer
ATTORNEYS

Patented May 11, 1943

2,318,589

UNITED STATES PATENT OFFICE 2,318,589

METHOD OF MAKING ARTICLES OF MANUFACTURE

Le Roy T. Barnette, Detroit, Mich., assignor to The Standard Products Company, Port Clinton, Ohio, a corporation of Ohio Application August 2, 1940, Serial No. 349,671

10 Claims. (Cl. 18—59)

In the molding of plastic materials over or around metal cores—for example, rods, castings, sheet metal stampings, etc.—it is customary to apply such materials directly to the metal. If the plastic material is relatively transparent or translucent, then surface defects, tool marks, spots due to oxidation, etc., show through the molded overlay or cover, sometimes magnified, and detract from the desired appearance. Even when appropriate steps, such as sand blasting, careful cleaning, etc., are taken to render the metal surface substantially uniform before the molding is done, non-uniform or undesirable appearances can occur, due to the handling of the cores or base members in performing the molding operations, or due to the action of heat or chemical action on the metal surface during or after molding of the envelope or overlay.

The principal object of the present invention is to provide a simple and effective method of eliminating undesirable effects in moldings of the types above referred to, and to provide an improved composite article of manufacture which includes a filling or strengthening core and an overlay of more or less transparent or translucent moldable plastic material.

Specifically in connection with the molding of relatively transparent thermoplastic material around metal cores, an object is to provide a core treatment which will be inexpensive, yet highly effective in eliminating unsightly appearances from the finished articles and which can, if desired, be used to improve the appearance of such articles.

Figure 1:
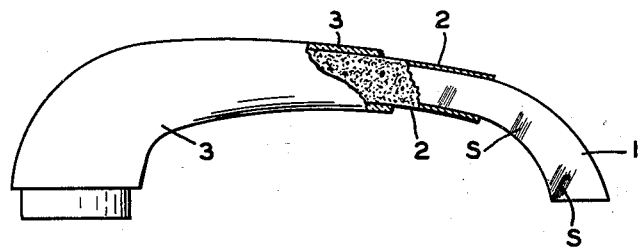
Figure 2:
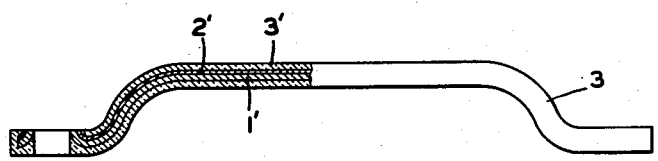

Other objects and features of the invention will become apparent from the following description which relates to the accompanying drawing, in which:

Fig. 1 is a partial sectional view of a door handle with a cast metal core and an enveloping coating of moldable material; and Fig. 2 is a similar sectional view of a handle or like member similarly made but with a sheet metal base for reinforcing the article.

Briefly described, the invention, as to the method, comprises, in part, the treatment of the metal core or base as by coating it, or chemically treating it to produce a uniform appearance over predetermined areas of the core or base, and, additionally, or as part of a single treatment, to render the exposed surface resistive to heat and pressures incident to the molding of plastic materials adjacent thereto; and then applying an overlay or envelope of thermoplastic or thermalsetting material around or over the core or base.

The core 1 in Fig. 1 may, for example, have applied over substantially its entire surface, as by spraying or dipping, a thin, opaque coating 2 such as commonly known in the decorative arts as "ground color." This can consist substantially only of non-volatile material (pigment and binder), assuming the fluid vehicle is suitably dried out of the coating material as by baking. The coating 2 is sufficiently opaque, either due to thickness of application or the pigments used, so as to conceal spots such as indicated at S, representing abrasion marks, for example.

The coated core can be placed in a mold (not shown) in at least partially spaced relation to the mold cavity, and plastic hardenable material 3 injected into the mold around it or on it and formed to shape, for instance, as a complete envelope for the coated core of uniform thickness. Alternatively, the plastic material can be applied in sheet or granular form so as partially or wholly to surround the coated core, or in any other manner known in modern plastic molding. The molded cover or envelope may be thermalsetting or thermoplastic material, a preferred example of the latter being cellulose acetate in a form adapted to be injected under high pressure, as of several tons per square inch, into the mold and therein hardened as by cooling around or on the coated core.

When the article being treated is of relatively large area and is coated or colored with lacquer or enamel, certain precautions must be taken with regard to the character of the thermoplastic material. Under the conditions noted, I prefer to use one of the harder varities of cellulose acetate for the following reason. Under the influence of the heat and pressure incident to the injection molding process there may be an exudation or bleeding of plasticizer or combination of plasticizer and acetate, which takes place between the acetate coating and the enameled or lacquered insert, and which has a deleterious effect on the lacquer or enamel. I have discovered that this injurious effect may be avoided by the use of cellulose acetate formulae which are harder and relatively more resistant to the effects of heat and pressure, so as to be substantially free from the aforesaid exudations. Such formulae may be made up, as is well understood in the art, by using less plasticizer, thereby reducing the bleeding tendency.

The molding operation in the case of using, e. g., cellulose acetate, requires varying degrees of heat, depending on the grade and color of the stock and the finish desired. The heat is usually from about 250° to 400° F. Consequently, the nature of the opaque or metal-concealing coating is determined in accordance with the heat required in molding the plastic material.

The coating 2 can be of any of the so-called synthetic varnish or lacquer materials that will stand the molding temperatures without blistering, cracking or flowing. Thermal-setting materials are therefore well adapted to the purpose. Baking enamels, such as used on kitchenware, for example, are suitable.

In the majority of instances it is unnecessary to obtain bonding or adhesion between the coating 2 and envelope or overlay 3, due to the partial or complete envelopment of the core on opposite portions of it and/or to irregularities of the core. But, particularly when the envelope or overlay 3 is applied by injection molding under high pressures, it is believed necessary to secure exceptionally good adhesion between the coating 2 and the core or base, in order to prevent movement or abrasion of the coating 2 by the injected material which forms the envelope or overlay. The desired results are accomplished in part by making certain that the coefficient of friction between the coating material 2 and the core or base is greater than the maximum expected coefficient between the exterior surface of the coating 2 and the injected or pressed-on plastic material during formation of the envelope or overlay. Thus both smoothness and hardness for the outer surface of the coating 2 are desirable, with less smooth surface contact (and enhanced adhesive force) between the coating 2 and the core or base. In compression molding, the likelihood of displacement, defacement or rupture of the coating 2 would not be as great. Coating materials that can be baked on while securing uniform surface finish usually afford adequate bonding with metal, whether in the form of castings or sheets. In carrying out the method herein described on cores or bases made from sheet stock with smooth surface finish (e. g., cold rolled steel), it is desirable to subject the core or base material to an acid bath or to etch the surface to roughen it in appropriate manner in order to secure proper adhesion between the coating 2 and such core or base material.

Fig. 2 illustrates substantially the same procedure as Fig. 1. In Fig. 2, the core 1' is a sheet metal stamping, and the defect-concealing coating 2' may only be applied on one surface of the stamping, namely, that which would normally be exposed through the transparent or translucent molded material 3'.

The surface of the coating 2 or 2' can be varied in accordance with the resultant effects desired. The surface may be shiny or flat to any desired degree and of any color. The color may be selected so as to combine with that of a molded material in obtaining the desired ultimate color.

Variegated patterns can be secured on the surface of the coating 2 in any of the various ways known in the decorative arts, and clear or sufficiently transparent molding material used thereover to display the variegated nature of the coating 2. Crystalline or wrinkle-finish effects can be had by appropriate selection or treatment of the coating material, with beneficial results. Moreover, the coating can be used to tone portions of the finished product where the molded material is necessarily of greater thickness in some regions than in others, thereby to secure uniformity when, due to the variation in thickness, the color appearance would not otherwise be uniform. It can also be used to control or produce depth effects.

Specific examples of coating materials for the element 2 that are suited to one or more of the above described variations of the method are baking synthetic enamel, sold by Rinshed-Mason Company, Detroit, Michigan, and ground coat colors, sold by The Glidden Company, Cleveland, Ohio.

Instead of coating the cores or bases mechanically, as heretofore described, appropriate variations in so-called "process coloring of metals" may be used to produce on the metal a film which will conceal the surface defects or undesirable surface appearances, or operate in conjunction with the overlay of plastic material to effect such purpose. Various examples of such "process coloring" are described in "Aluminum Products and Their Fabrication" (Aluminum Industries), pp. 470–477, published in 1930 by McGraw-Hill Publishing Company.

Wherever in the appended claims I use the term "transparent," it is to be understood that said term also comprehends the term "translucent" since obviously any object which is visually transparent must necessarily be translucent. Wherever in said claims, I use the term "core" it is to be understood that it comprehends the base material which is to be coated as hereinabove described.

This application is a continuation in part of my copending application, Serial No. 216,559, filed June 29, 1938.

What I claim is:

1. In injection molding of thermal-setting or thermoplastic materials of relatively translucent or transparent character over or around bases or cores, the improvement comprising concealing undesirable surface effects on the base or core surface prior to the molding operation with material which will withstand molding temperatures without substantial change in surface appearance and will not be moved by flow of plastic material thereover at molding pressures, then placing the base or core, treated as aforesaid, in a mold and then injecting relatively translucent or transparent material into the mold upon at least a portion of the core.

2. The method of forming a composite article including a metal core, comprising applying to surface portions of the core substantially opaque material which will withstand temperatures ordinarily employed in the molding of plastic materials of the kind described, causing the material to adhere firmly to the core, and applying by injection molding, an overlay of substantially transparent or translucent plastic material on the coated core.

3. The method of forming a composite article including a metal core, comprising roughening surface portions of the core and coating the same uniformly with substantially opaque coating material having a hard, substantially smooth outer surface that will withstand temperatures and pressures ordinarily employed in the molding of plastic materials of the kind described, and applying plastic material on the coated core under substantial pressure accompanied by flow of the plastic material parallel to the outer surface of the opaque coating material.

4. In the molding of relatively thin translucent or transparent envelopes or overlays of thermoplastic material around or over metal cores, the method of preventing exposure of defects on such metal cores, comprising applying a relatively thin coating of substantially opaque thermal-setting material to the core in covering relation to defects thereon, hardening the coating by application of heat thereto, and then molding the thermoplastic material on the core.

5. The method of forming a composite article including a core, comprising applying to surface portions of the core substantially opaque material which will withstand temperatures ordinarily employed in the molding of plastic materials of the kind described, causing the material to adhere firmly to the core, and applying, by injection molding, an overlay of substantially translucent or transparent thermoplastic material on the coated core, said thermoplastic material being characterized by substantial absence of injurious exudation under the influence of the thermoplastic molding process.

6. The method of forming a composite article including a core, comprising applying to surface portions of the core substantially opaque material which will withstand temperatures ordinarily employed in the molding of plastic materials of the kind described, causing the material to adhere firmly to the core, and applying, by injection molding, an overlay of substantially translucent or transparent thermoplastic material on the coated core, said thermoplastic material comprising cellulose acetate of relatively low plasticizer content.

7. In the injection molding of plastic materials of relatively translucent or transparent character over or around a base or core, the improvement comprising concealing undesirable surface effects on the core surface prior to the molding operation with material which will withstand molding temperatures without substantial change in surface appearance and will not be moved by flow of plastic material thereover at molding pressures, then placing the core, treated as aforesaid, in a mold and thereafter injecting thermoplastic material of translucent or transparent character into the mold over or around said core, said thermoplastic material being characterized by substantial absence of injurious exudation under the influence of the thermoplastic process.

8. In the injection molding of plastic materials of relatively translucent or transparent character over or around a base or core, the improvement comprising concealing undesirable surface effects on the core surface prior to the molding operation with material which will withstand molding temperatures without substantial change in surface appearance and will not be moved by flow of plastic material thereover at molding pressure, then placing the core, treated as aforesaid, in a mold and thereafter injecting thermoplastic material of translucent or transparent character into the mold over or around said core, said thermoplastic material comprising cellulose acetate of relatively low plasticizer content.

9. In the molding of plastic materials of relatively translucent character around a metal core, the improvement comprising applying to the core a relatively thin, substantially opaque coating material in a fluid vehicle, baking said core until substantially all the fluid vehicle is driven from the coating, and then, by injection molding, enveloping the coated core with transparent or translucent plastic material in a mold.

10. In the making of a composite article including a core and a substantially translucent or transparent, hardenable plastic envelope, the improvement comprising applying to the core a thin film of non-volatile material in a fluid vehicle, hardening the coating by evaporating all the fluid vehicle therefrom, and then molding substantially translucent or transparent plastic material upon at least a portion of the coating.

LE ROY T. BARNETTE.